United States Patent [19]

Eichelberger et al.

[11] Patent Number: 4,495,251
[45] Date of Patent: Jan. 22, 1985

[54] SHIELDED PLASTIC MICROWAVE OVEN CAVITY

[75] Inventors: Charles W. Eichelberger, Schenectady; Robert J. Wojnarowski, Clifton Park, both of N.Y.; Peter I. Cohen, Louisville, Ky.

[73] Assignee: General Electric Company, Schenectady, N.Y.

[21] Appl. No.: 466,175

[22] Filed: Feb. 14, 1983

Related U.S. Application Data

[62] Division of Ser. No. 220,332, Mar. 11, 1981, Pat. No. 4,385,082.

[51] Int. Cl.$^3$ .............................. B22F 7/04; B05D 5/12
[52] U.S. Cl. ...................................... 428/548; 428/560; 428/561; 427/96; 427/105; 219/10.55 R
[58] Field of Search ............... 428/548, 560, 557, 561; 427/96, 105; 219/10.55 R

[56] References Cited

U.S. PATENT DOCUMENTS

| | | | |
|---|---|---|---|
| 3,332,860 | 7/1967 | Diebold et al. | 204/38 |
| 3,764,280 | 10/1973 | Lupinski | 428/560 |
| 4,008,383 | 2/1977 | Tanaka et al. | 219/10.55 D |
| 4,248,921 | 2/1981 | Steigerwald et al. | 428/560 |
| 4,284,665 | 8/1981 | Heimala et al. | 427/203 |
| 4,404,237 | 9/1983 | Eichelberger | 427/96 |

Primary Examiner—Ben R. Padgett
Assistant Examiner—Anne Brookes
Attorney, Agent, or Firm—Geoffrey H. Krauss; James C. Davis, Jr.; Marvin Snyder

[57] ABSTRACT

A microwave oven cabinet is constructed with plastic materials and has a low resistivity coating on the outside surfaces thereof, which coating is achieved by applying a mixture of a metallic powder and polymer on the surfaces and curing the polymer, followed by an augmentation replacement reaction being effected to replace some of the metallic powder with a more noble metal in such a way that the total volume on the surface of deposited metal exceeds that of the original metal powder replaced at the surface.

10 Claims, 2 Drawing Figures

SHIELDED PLASTIC MICROWAVE OVEN CAVITY

This application is a division of application Ser. No. 220,332, filed Mar. 11, 1981, now U.S. Pat. No. 4,385,082.

BACKGROUND OF THE INVENTION

Microwave oven cavities or cabinets are presently constructed of steel. In order to reduce the cost of the overall microwave oven, it is clearly desirable to construct the cavity using a suitable plastic material such as an injected molded plastic or polymeric material as the material of construction. Such plastics are, however, non-conducting and permit the escape of microwave energy by transmission outside of the cavity. For safety to the user and for proper adjustments of the microwave oven, this is highly undesirable. It is, therefore, clearly necessary to provide some form of conductor to provide a shielding and cavity "tuning" function.

Many different methods designed to realize a conductor on the outside of a plastic microwave cavity have been attempted. For example, a fine mesh metal screen has been incorporated in the plastic layer and does provide the desired shielding function, but this procedure is not amenable to plastic molding processes. Loading, i.e., filling, the plastic with a conductive material has also been attempted but in such constructions, each metallic particle is insulated and isolated in the plastic matrix resulting in significant heating losses. Covering the outside of the microwave cavity with a conductive paint does provide the required shielding function; unfortunately, such conductive paints are based on a polymer which is loaded with a silver powder which means that the costs fluctuate greatly depending on the price of silver available on the world market and at present prices, the silver conductive coatings eliminate any cost advantages realized by using plastic cavities instead of steel. Further, while it is feasible to load such polymers with carbon in order to provide the conductive function at a lower cost, the resistivity is much too high to provide adequate shielding and tuning.

Accordingly, it is the object of this invention to provide a shield coating process for a plastic microwave oven cavity to provide a coating of sufficiently low resistivity to be effective for microwave shielding, which process is facile, low in cost and provides a shield coating which is contiguous without breaks at the edges of the cavity or holes in the conductive coating. This and other objects of the invention will become apparent to those skilled in the art from the following detailed description.

SUMMARY OF THE INVENTION

In accordance with the invention, a shielded plastic microwave oven cabinet is provided with a lower resistivity coating on at least one of the inside or outside surfaces thereof by applying a finely divided metallic powder in a curable polymer to the microwave cavity, curing the polymer and thereafter contacting the resulting cabinet with a metal salt solution in which the metal cation is more noble than the finely divided metal of the powder.

DESCRIPTION OF THE INVENTION

Figure 1:
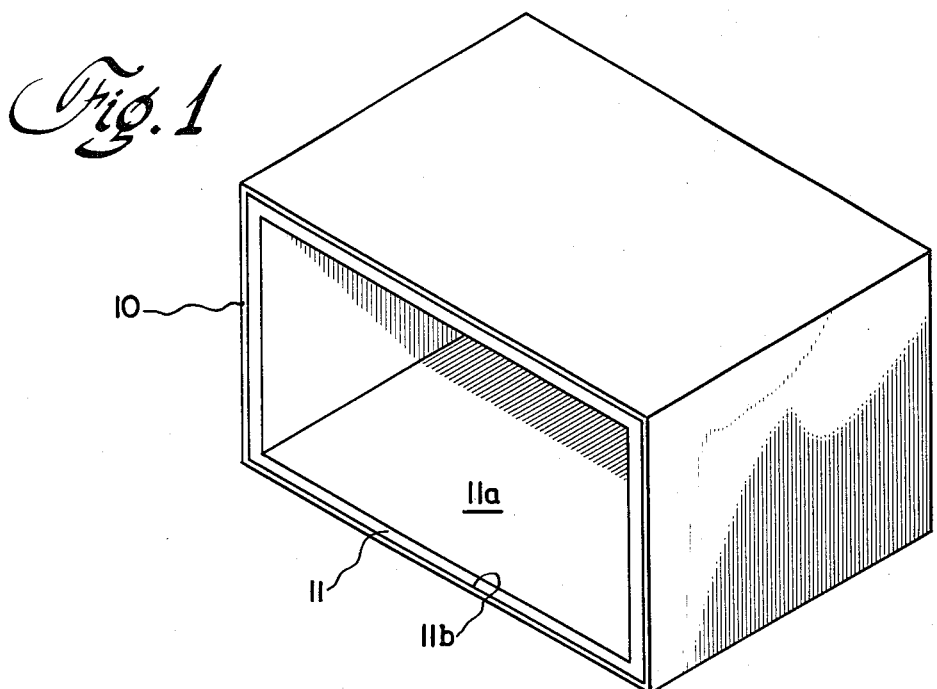
FIG. 1, is a perspective view of the shielded microwave cover cavity fabricated in accordance with the invention.
Figure 2:
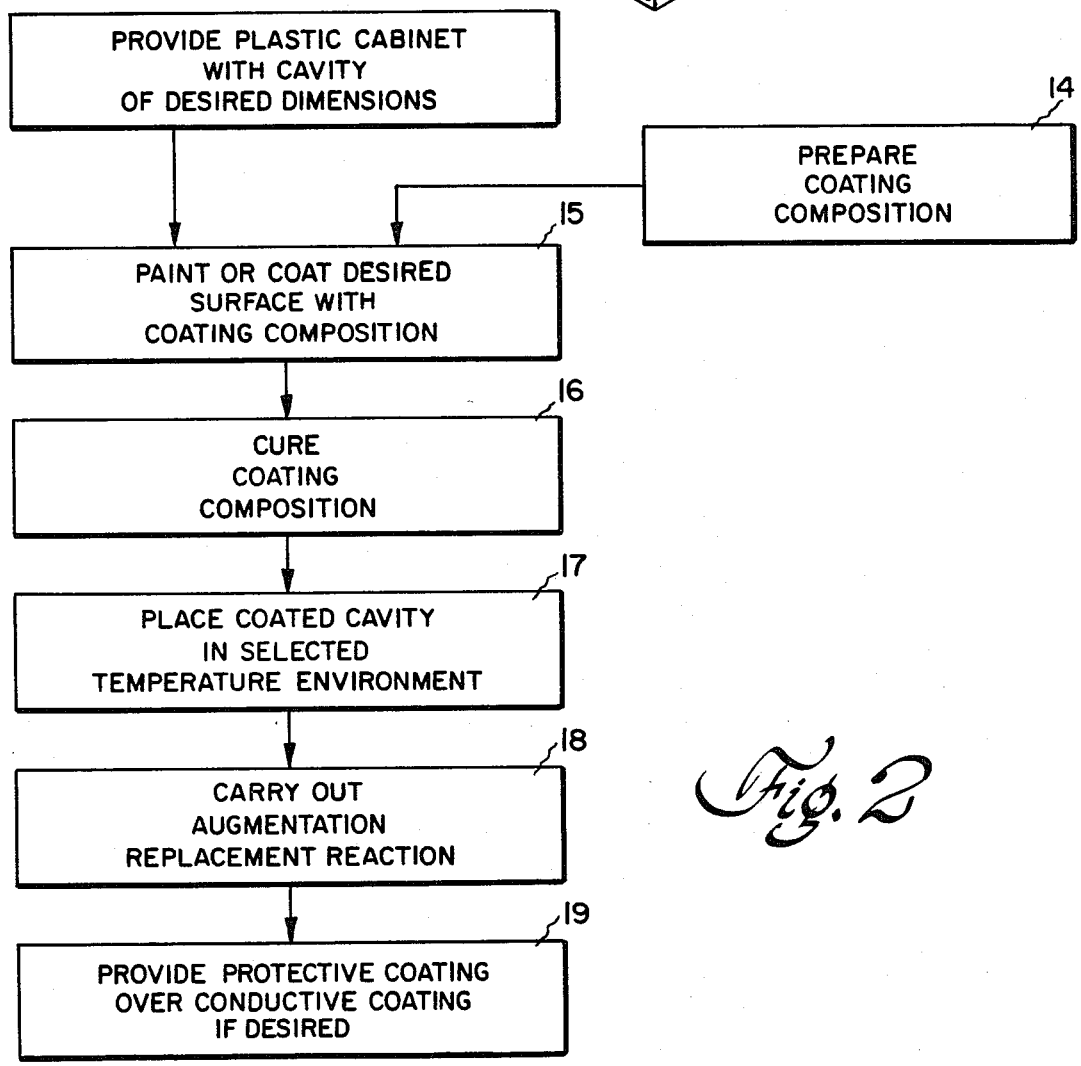
FIG. 2, is a flow diagram of the steps utilized in fabricating the shielded cavity in accordance with the process of the present invention.

The oven cavity of the present invention, in its broadest form, is fabricated by the establishment of a low resistivity coating 10 on at least one of the inside surface 11a or outside surface 11b of a microwave oven cavity cavity 11 by means of metal-containing, cured polymer which is subjected to an augmentation replacement reaction. The microwave oven cabinet construction is conventional except that a suitable plastic, e.g. an injection molded polymeric material, is used as the material of construction rather than steel.

In the first step 15 of the process for forming the oven cavity of this invention, the plastic microwave cabinet 11 is painted or coated on its desired, e.g. exterior, surfaces with a metallic coating composition, prepared in a previous step 14. The coating procedure can take any conventional form such as spray coating, dip coating, roll coating or the like. The metal coating composition used in the present invention is as described in co-pending allowed application Ser. No. 220,342, filed Dec. 29, 1980, now U.S. Pat. No. 4,404,327 and is a combination of a finely-divided metallic powder with a polymer whose viscosity and flow characteristics is controlled by the incorporation of a solvent therein. The metal can be any metal which is stable in the coating composition and cured polymer and which can be obtained in finely divided form and which also is placed above the metal used in the augmentation replacement reaction in the activity series of the metals. Because of its availability and low cost, the preferred metal is iron. The metal powder generally has a particle size of less than about 50 microns, preferably 3 to about 25 microns and most preferably less than 10 microns. When the coating composition is deposited by screen printing, the metal particles must be of a size to pass through the screen.

The polymers employed in the coating composition are any curable material or mixture thereof which exhibits a degree of adhesion to the plastic microwave oven cabinet substrate being employed and to the finely divided metal powder which is dispersed therein. Typical polymers which can be employed include the homopolymers and copolymers of ethylenically unsaturated aliphatic, alicyclic and aromatic hydrocarbons such as polyethylene, polypropylene, polybutene, ethylene propylene copolymers, copolymers of ethylene or propylene with other olefins, polybutadiene, polyisoprene, polystyrene and polymers of pentene, hexene, heptene, bicyclo-(2,2,1)2-heptane, methyl styrene and the like. Other polymers which can be used include polyindene, polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose, and sodium carboxymethyl cellulose; epoxy resins; hydrocarbon resins from petroleum; isobutylene resins; isocyanate resins (polyurethanes); melamine resins such as melamine-formaldehyde and melamine-urea-formaldehyde; oleo-resins; polyamide polymers such as polyamides and polyamide-epoxy polyesters; polyester resins such as the unsaturated polyesters of dibasic acids and dihydroxy compounds; polyester elastomer and resorcinol resins such as resorcinol-formalde-hyde, resorcinol-furfural, resorcinol-phenol-formaldehyde and resorcinol-urea; rubbers such as natural rubber, reclaimed rubber, chlorinated rubber, butadiene styrene rubber, and butyl rubber, neoprene rubber, polysulfide, vinyl acetate and vinyl alcohol-acetate copolymers, polyvinyl alcohol, polyvinyl chloride, polyvinyl pyrollidone and polyvinylidene chloride, polycarbonates, graft copolymers of polymers of unsaturated hydrocarbons and of unsaturated monomers such as graft copolymers of polybutadiene, styrene and acrylonitrile, commonly called ABS resins, polyamides and the like, and such other polymers as described in the aforementioned application Ser. No. 220,342 now U.S. Pat. No. 4,404,237.

The polymers and coating compositions of the present invention can contain various other materials such as fillers, e.g., glass fiber, glass powder, glass beads, asbestos, mineral fillers, wood flower and other vegetable fillers, dyes, pigments, waxes, stabilizers, lubricants, curing catalysts such as peroxides, photosensitizers and amines, polymerization inhibitors and the like. It is preferred, but not essential, to employ a polymer which exhibits a substantial degree of volumetric shrinkage upon curing.

The amounts of the finely divided metal and polymer are adjusted such that the metal constitutes about 60–80% by volume of the mixture after curing. Preferably, the metal is about 70% by volume. It is desired to have a significant amount of the metal particles forming part of the surface of the cured coating composition to facilitate the subsequent augmentation replacement reaction.

A solvent is used in the coating composition formulation in order to adjust the viscosity and flow characteristics for the type of printing desired. In general, the solvent should be employed in an amount sufficient that the coating composition has a viscosity of 15,000–200,000 cps at room temperature and preferably about 50,000–150,000 cps. Suitable solvents or diluents can be aliphatic or aromatic and usually contain up to about 30 carbon atoms. They include the hydrocarbons, ethers and thioethers, carbonyl compounds such as esters and ketones, nitrogen containing compounds such as amides, amines, nitriles and nitro compounds, alcohols, phenols, mercaptans and halogen containing compounds. Examples include alcohols such as methanol, ethanol, propanol, benzyl alcohol, cyclohexanol, ethylene glycol, glycerol and the like, aromatic materials such as benzene, toluene, xylene, ethyl benzene, naphthalene, tetralin and the like, ethers such as methyl ether, ethyl ether, propyl ether, methyl t-butyl ether, and the like, alkanes such as methane, ethane, propane and the like, dimethyl sulfoxide, butyl formate, methyl acetate, ethyl acetate, formamide, dimethyl formamide, acetamide, acetone, nitrobenzene, monochlorobenzene, acetophenone, tetrahydrofuran, chloroform, carbon tetrachloride, trichloroethylene, ethylbromide, phenol, mercaptophenol, and the like. Additionally, reactive solvents or diluents such as triallyl isocyanurate can be used if desired. It is preferred to employ a solvent which is relatively non-volatile at room temperature so that the viscosity and flow of the coating composition is appropriate during application to the substrate and highly volatile at the curing temperature of the polymer or at other temperatures above the application temperature. The carbitol series of solvents and particularly butyl carbitol (diethylene glycol monobutyl ether) has been found to be particularly appropriate.

The coating composition 10 is applied to the cavity surface to achieve the desired conductor thickness thereon. Any temperature which will not cause premature curing of the coating composition and at which the viscosity and flow characteristics of the coating composition are appropriate to the application technique used can be employed. It is preferred, but not necessary, to permit at least a portion of the solvent to evaporate after application of the coating composition to the cavity surface and before curing. The act of evaporation exposes additional metal powder and increases the ratio of metal powder to polymer so as to achieve a balance between sufficient metal to provide a base for the conductive film to be formed thereon and too little polymer to act as a binder to hold the metal particles. Preferably, the drying is effected for 0.1–1 hour, more preferably about 0.25–0.5 hour, at a temperature of about 70°–150° C., most preferably about 110°–130° C.

In the next step 16 in the instant process, the coating composition polymer is cured or polymerized by the most convenient method. If an autocatalyst has been added, the polymer will cure by itself with no additional initiation. In the case of ultraviolet light initiators, the substrates carrying the conductor patterns can be passed under a high intensity ultraviolet source which causes the initiators to begin the curing reaction. It is presently preferred to employ a thermal curing system which is activated by exposure to temperatures of about 140°–200° C., preferably 150°–180° C., for a time of 0.1–1 hour, preferably 0.15–0.5 hour. As a result of this step, a closely compacted metal powder bound to the substrate by the cured polymer is achieved. Because of the high percentage of metal and shrinkage of the polymer chosen, the metal containing coating thus obtained may have some conductivity due to physical contact between the metal particles. In the preferred embodiment of this invention that conductivity is on the order of about 30 Kohm per square for a one mil thick deposit. The resistance will be highly variable and increase substantially if the system is subjected to oxidizing conditions for any period of time since an oxide builds up between particles and reduces conductivity.

The coating composition carrying substrate is subjected to an augmentation replacement reaction in which some of the metal of the powder is replaced by a metal further down in the activity series, i.e., one which is more noble. This step takes advantage of the known chemical behavior of metals that any metal will displace any succeeding, less active, metal from a water solution of one of its salts. However, in this invention, it has been found that while the powder metal enters into solution, an amount of more noble metal is deposited beyond that which would form a one-to-one exchange with the powder metal. The additional metal from the solution plates to the original and replacement metal particles which are adhered to the cavity surface by the polymer. Thus, all metal particles at the surface are interconnected and form a contiguous film of conductive metal over the cavity surface. It has been found that several hundred microinches of conductor material can be built up from a solution in a period of 5 minutes.

The augmentation reaction reagent is a solution, preferably inorganic and most preferably aqueous, of a metal salt. The cation of the metal salt is any more noble or electropositive metal than the metal of the finely divided powder, i.e., lies below the powder metal in the activity series, and which is electrically conductive. Any anion can be used which is relatively inert, i.e., does not deleteriously affect the process and which forms soluble salts with both the cation metal and the powder metal. Typical salts include copper nitrate, copper acetate, copper fluoroborate, potassium gold cyanide, nickel sulfate, nickel chloride, nickel sulfamate, potassium silver cyanide, silver chloride and the like. The presently preferred metal salt is copper sulfate. The concentration of the metal salt in the solution can range from 0.1 molar to saturation but is preferably about 0.5-2.0 molar. Below about 0.5 molar, deposition rates are inordinately slow and there is no improvement in rate at molarities above 2.0. Most preferably, the metal salt is present at a concentration of about 1 molar.

The augmentation reaction (step 18) can be carried out at any suitable temperature (step 17), although elevated temperatures are generally preferred in order to increase reaction rate. Thus, any temperature from ambient up to about 100° C. can be employed although the temperature is preferably about 45°-60° C. Generally the augmentation reaction is completed in about 0.01-1 hour or more, preferably about 5 minutes.

There are occasions when the adhesion of the newly plated solution metal to the powder metal surface may be less than desired. The reason is that the metal powder at the surface of the cured conductive coating composition can become coated with a contaminate such as oxides or oils which will prevent good adhesion. Additionally, portions of the polymeric binder material may overlie the powder metal and interfere with proper adhesion. On such occasions, adhesion can be improved by abrading the surface of the powder metal particles either before or simultaneously with contact with the augmentative replacement solution. In the case of simultaneous application, the augmentation reaction on the metal particles will begin immediately with exchange in the areas where contaminate does not exist adhering to the metal particles. The abrasive will dislodge those areas where there is poorly adherent metal or contaminate or both, leaving a clean surface behind, and the augmentation reaction will then commence on the newly cleaned surfaces. In general, any non-reactive solid such as talc can be used as an abrasive. Powdered alumina and fine sea sand have been successfully used. One particularly interesting abrasive is anhydrous copper sulfate. If one employs an amount of anhydrous copper sulfate beyond that required for saturation of the metal salt solution, the excess will form a wet slurry which can be used as an abrasive and has the added property of supplying ions of copper for exchange and plating to the metal particles. Alternatively, a slurry of the abrasive and metal salt solution can be sprayed toward the conductor coating composition pattern. It should be noted that the abrading action need not be continuous in that the desired deposition can occur continuously with abrasive action taking place progressively over the substrate. Such action would be representative of mechanical rubbing systems such as rollers. Moreover, there need not be any loss of the material except for that which is plated onto the substrate, i.e., the abrasive and metal salt solution which is sprayed or rubbed on the substrate can be recovered and reused.

It is often desirable to use zinc as the powder metal because of its very low cost and because zinc reacts readily with simple copper salt solutions. Unfortunately, the zinc reacts too vigorously resulting in a very porous and spongy copper film. Further, in some fabrication systems using iron powder, there is a moisture susceptibility problem because the iron has a tendency to rust. These problems can be avoided to a great extent by using a mixture of powdered metals.

One preferred powder metal mixture contains about 35-45% zinc, preferably about 40%, and 65-55% nickel, preferably about 60%. This combination exhibits a high degree of conductivity before the augmentative replacement reaction step and has certain advantages in reducing the rate of reaction with zinc because an enlarged electrically conductive surface area is presented to the metal salt solution while a relatively smaller proportion of that area is the quite reactive zinc powder. As a result, a high quality conductive coating is formed which has a very high degree of adhesion even though the reaction involves zinc and copper which are quite displaced from one another in the activity series of the metals. The presence of the nickel reduces this vigorous reaction. The resulting conductor system also has the advantage of being stable in the presence of high degrees of moisture. When iron is used as the reactive metal, it tends to rust and form an unsightly deposit on the surface of the conductor and in areas immediately adjacent to the conductor on the substrate. In extreme cases, the resistance between closely spaced conductive coatings can actually be reduced. In the nickel zinc system, the zinc does not rust and very little corrosion product is formed even in very high moisture environments. It further has been found that by raising temperatures at which the augmentative replacement is conducted to about 65° C. and by adding a small amount of nitric acid to the copper sulfate solution, improved coating can be achieved which is primarily manifested by a reduced resistivity of the coating. It is believed that the nitric acid probably acts to clean the passivated surface of the nickel allowing it to enter into the replacement reaction rather than merely be coated.

A second presently preferred mixed metal powder mixture contains about 20-35% copper powder, preferably about 25-30%, about 15-30% tin powder, preferably about 20-25%, about 10-25% aluminum powder, preferably about 15-20%, and about 25-40% iron powder, preferably about 30-35%. Improved adhesion as well as increased conductivity can also be obtained by pre-dipping a substrate coated with such a combination of metal powder in a solution of alkali such as sodium hydroxide. The caustic solution tends to attack the surface of the polymeric binder exposing more of the metal particles at the surface as well as sensitizing the aluminum. As a result, when the cured coating composition is dipped into an acidic copper sulfate solution, some plating also occurs on the aluminum due to an electrochemical reaction before the acid tends to anodize and passivate the aluminum. At this point, the iron, and to a much lesser extent the tin, are dissolved in the copper sulfate solution to form iron or tin sulfate while copper plates out on all of the exposed metal at the surface of the polymer. The conductivity can be varied in the above combination by increasing the percentage of iron and decreasing the other metals proportionally. The amount of tin can be reduced but this also reduces the solderability of the resulting conductor. Reducing the amount of copper and increasing the amount of aluminum or the total amount of the other materials in the cured coating composition will tend to reduce adhesion of coating composition to the substrate.

The conductive coating realized by the process of this invention described above is relatively thin and it may be desirable to protect the coating in some way. Various alternatives can be adopted. One such alternative is to make the copper layer coating thicker by connecting the contiguous coating of copper to an electrical energy source and deposit a thicker layer of copper by electroplating. A preferred alternative is to coat (step 19) the conductive layer with a protective layer such as, for example, the coating composition used to deposit the metallic particles but without those particles. One attractive alternative is to repeat the process of this invention using the contiguous metal coating as a substrate to realize two layers of shielding material with the second layer constituting a protective layer for the first metal bearing plasticized paint.

In order to further illustrate the present invention, various examples are set forth below. It will be appreciated that these examples are set forth in order to further illustrate the invention, but are not intended to limit it. Further, it should be appreciated that all parts and percentages are by weight and all temperatures in degrees Celsius throughout this specification and claims unless otherwise indicated.

A shield paint was prepared by mixing 15 grams of a commercially available acrylic paint, 6 grams of conventional paint thinner, 5 grams of methyl ethyl ketone and 74 grams of $-325$ mesh iron powder. A coating of the shield paint was applied to a sheet of ABS plastic with a paint brush and allowed to dry, i.e., cure by a siccative mechanism, for 0.5 hour in the ambient surroundings. The coated ABS sheet was then dipped into a 1 molar solution of copper sulfate pentahydrate for three minutes. As a result of this procedure, a contiguous, highly conductive coating suitable for microwave shielding was obtained on the surface of the plastic.

Various changes and modifications can be made in the process and products of this invention without departing from the spirit and scope thereof. The various embodiments which were disclosed herein were for the purpose of further illustrating the invention but were not intended to limit it.

We claim:

1. A plastic microwave oven cabinet having a low resistivity coating on at least a portion of at least one of the inside and outside surfaces thereof, said coating comprising a cured polymer containing therein a first finely divided metallic composition with particles of size greater than about 3 microns and less than about 50 microns and a second metal; the contents of the metal of said first metallic composition and second metal in said cured polymer being about 60-80%, by volume; and a contiguous layer of said second metal on said cured polymer, wherein said second metal is below the metal of said first metallic composition in the activity series.

2. The plastic microwave oven cabinet of claim 1, wherein the metal of said first metallic composition comprises iron and said second metal comprises copper.

3. The plastic microwave oven cabinet of claim 1 or 2, wherein said polymer is an acrylic polymer.

4. The plastic microwave oven cabinet of claim 3, wherein said contents are about 70%, by volume.

5. The plastic microwave oven cabinet of claim 1, having an electroplated layer of said second metal on said contiguous layer of said second metal.

6. The plastic microwave oven cabinet of claim 1, further comprising: a layer of said cured polymer, containing said first metallic composition and said second metal, on said contiguous layer of second metal; and a second contiguous layer of second metal on said second cured polymer.

7. The plastic microwave oven cabinet of claim 1, wherein the metal of said first metallic composition comprises a mixture of about 35-45% of zinc and about 65-55% of nickel.

8. The plastic microwave oven cabinet of claim 7, wherein the metal of said first metallic composition comprises about 40% of zinc and about 60% of nickel.

9. The plastic microwave oven cabinet of claim 1, wherein the metal of said first metallic composition is a mixture comprised of about 20-35% of copper, 15-30% of tin, 10-25% of aluminum and 25-40% of iron.

10. The plastic microwave oven cabinet of claim 9, wherein the metal of said first metallic composition comprises a mixture of about 25-30% of copper, about 20-25% of tin, about 15-20% of aluminum and about 30-35% of iron.

* * * * *